United States Patent
Serry et al.

(10) Patent No.: US 11,995,892 B2
(45) Date of Patent: May 28, 2024

(54) TEXTLESS MATERIAL SCENE MATCHING IN VIDEOS

(71) Applicant: Microsoft Technology Licensing, LLC, Redmond, WA (US)

(72) Inventors: Mattan Serry, Herzliya (IL); Zvi Figov, Modiin (IL); Yonit Hoffman, Herzliya (IL); Maayan Yedidia, Ramat Gan (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/804,188

(22) Filed: May 26, 2022

(65) Prior Publication Data

US 2023/0316753 A1   Oct. 5, 2023

Related U.S. Application Data

(60) Provisional application No. 63/325,499, filed on Mar. 30, 2022.

(51) Int. Cl.
*G06V 20/40* (2022.01)
*G06V 20/62* (2022.01)
*G11B 27/036* (2006.01)

(52) U.S. Cl.
CPC .............. *G06V 20/48* (2022.01); *G06V 20/46* (2022.01); *G06V 20/635* (2022.01); *G11B 27/036* (2013.01)

(58) Field of Classification Search
CPC ...... G06V 20/48; G06V 20/46; G06V 20/635; G11B 27/036
See application file for complete search history.

(56) References Cited

U.S. PATENT DOCUMENTS

2019/0311744 A1* 10/2019 Shenkler ................ G11B 27/10

FOREIGN PATENT DOCUMENTS

WO    2020193784 A2    10/2020

OTHER PUBLICATIONS

"Discovery Textless Delivery Guide", Retrieved From: https://pmd.discovery.com/wp-content/uploads/simple-file-list/textless-material/Textless-Quick-Guide-2021.pdf, Dec. 31, 2021, 1 Page.
Anderson, et al., "Automating Media the Cloud for Media", Retrieved From: https://f.hubspotusercontent20.net/hubfs/8456220/DPP%20report.pdf, Oct. 31, 2021, 46 Pages.

(Continued)

*Primary Examiner* — Girumsew Wendmagegn

(57) ABSTRACT

Systems, methods, and a computer-readable medium are provided for matching textless elements to texted elements in video content. A video processing system including a textless matching system may divide a video into shots, identify shots having similar durations, identify sequences of shots having similar durations, and compare image content in representative frames of the sequences to determine whether the sequences match. When the sequences are determined to match, the sequences may be paired, wherein the first sequence may include shots with overlaid text and the second sequence may include textless version of corresponding texted shots included in the first sequence. In some examples, the video processing system may further replace the determined corresponding texted shots.

20 Claims, 7 Drawing Sheets

(56) References Cited

OTHER PUBLICATIONS

"International Search Report and Written Opinion Issued in PCT Application No. PCT/US23/010886", dated Apr. 6, 2023, 13 Pages.
Shane, et al., "Master Prores to HDCAM-SR Textless Timecode!", Retrieved From: https://creativecow.net/forums/thread/master-prores-to-hdcam-sr-textless-timecode/, Apr. 13, 2012, 6 Pages.
Wilson, Matt, "UHD Technical Specifications and Deliverables Schedule", Retrieved From: https://static.skyassets.com/contentstack/assets/bltdc2476c7b6b194dd/bltcdd208400052e6ca/5a982860e98228956fe50b05/Sky%20Vision%20UHD%20Technicalpdf, Feb. 2018, 14 Pages.
"Broadcast Television / Film Video-Audio Quality Control FAQ", Retrieved from: https://web.archive.org/web/20210508152450/https://www.qccentral.com/broadcast-video-quality-control-faq/, May 8, 2021, 8 Pages.
Ross, Nathan, "What are textless elements?", Retrieved from: https://www.blackwater.digital/2018/02/20/textless-elements/, Feb. 20, 2018, 4 Pages.

* cited by examiner

TEXTLESS MATERIAL SCENE MATCHING IN VIDEOS

CROSS-REFERENCE TO RELATED APPLICATIONS

This application claims the benefit of U.S. Provisional Patent Application No. 63/325,499, titled "TEXTLESS MATERIAL SCENE MATCHING IN VIDEOS," filed Mar. 30, 2022, which is incorporated by reference herein in its entirety.

BACKGROUND

As part of preparing a video for distribution, it is common practice to include, at the end of the video, footage from the video from which text (e.g., opening and end titles, subtitles, location titles, forced narratives, lower thirds, and/or other writing superimposed over video shots) has been removed. This additional footage is referred to as textless material, and the shots or sequences of shots included in this additional footage are referred to as textless elements. The textless material is used to localize or re-text a video for foreign-speaking destinations, as well as in the design of user interface menus and/or in marketing and publicity materials. As an example, a distributor associated with a foreign region may insert shots of textless elements at the end of a video to replace corresponding shots of texted elements. Accordingly, text in a language of the foreign region may be added to (e.g., superimposed over) these text elements to produce the video in the foreign language for distribution in the foreign region and/or other regions.

It is with respect to these and other considerations that examples have been made. In addition, although relatively specific problems have been discussed, it should be understood that the examples should not be limited to solving the specific problems identified in the background.

SUMMARY

Examples of the present disclosure describe systems and methods for matching textless elements to texted elements in video content. A video processing system including a textless matching system may divide a video into shots, identify shots having similar durations, identify sequences of shots having similar durations, and compare image content in representative frames of the sequences to determine whether the sequences match. When the sequences are determined to match, the sequences may be paired, wherein the first sequence may include shots with overlaid text and the second sequence may include textless version of corresponding texted shots included in the first sequence.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

The accompanying drawings, which are incorporated in and constitute a part of this disclosure, illustrate various aspects of the present invention. In the drawings.

DETAILED DESCRIPTION

As briefly discussed above, video content may include textless material including textless shots (referred to herein as textless elements) on which text has not been superimposed over shots in the video content or from which text superimposed over shots in the video content has been removed. Previous methods of matching textless material to corresponding texted material are performed manually by a video content distributor. As can be appreciated, these manual methods are not only be time-consuming and result in inefficient utilization of employees and computing resources, but are also prone to human error. Accordingly, a textless material matching system is provided herein that operates to automatically match textless material to texted material in video content. In some embodiments, the textless material matching system is in communication with or integrated with a video editing system that automatically replaces texted material with corresponding textless material. As can be appreciated, automated matching of texted and textless video material not only increases the speed of distribution of translated video content for multiple languages, but may also increase the accuracy of matched texted and textless material. These and other examples are described below with reference to FIGS. 1-6B.

Figure 1:
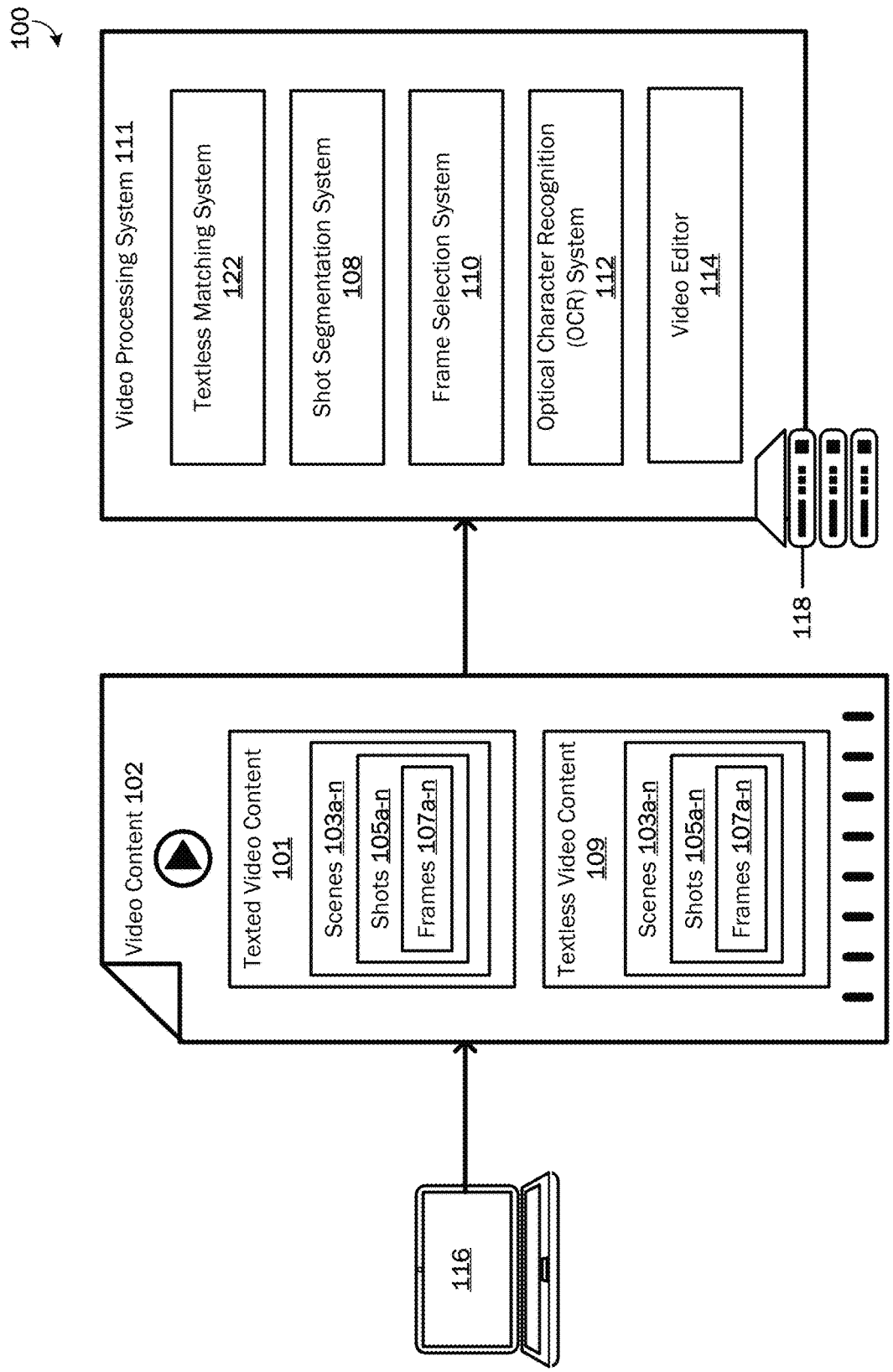
FIG. 1 depicts a system for providing matching textless elements to texted elements in a video content according to an example.

With reference now to FIG. 1, an example operating environment 100 is depicted in which a video processing system 111 comprising a textless matching system 122 is implemented for providing automated matching of texted and textless video material in video content 102. In an example, the video processing system 111 includes one or more server computer devices 118 supporting video processing. The server computer devices 118 includes web servers, application servers, network appliances, dedicated computer hardware devices, virtual server devices, personal computers, a system-on-a-chip (SOC), or any combination of these and/or other computing devices known in the art. As will be described herein, the video processing system 111 operates to execute a number of computer readable instructions, data structures, or program modules to provide automated matching of texted and textless video material for matching textless elements to texted elements in video content 102.

According to examples, the video processing system 111 receives video content 102 from a video content provider 116. The video content 102 includes video data in a video coding format. The video content 102 may further include audio data in an audio coding format, synchronization information, subtitles, and metadata. As is known in the art, video content 102 is comprised of a series of images captured by a camera, where each image is a frame 107a-n (collectively, 107). A shot 105a-n (collectively, 105) includes one or more frames 107 captured during an uninterrupted period of time from when the camera starts recording to when it stops recording (e.g., a single take). For instance, a shot 105 includes a sequence of consecutive frames 107 with no interruption. Typically, the video content 102 includes a plurality of scenes 103a-n (collectively, 103), which include a shot 105 or a plurality of shots 105. In an example, the shot or shots 105 of a scene 103 together comprise a single, unified dramatic event, action, unit, or element of video content narration. In another example, a scene is a segment of storytelling within video content.

In an example, some of the scenes 103 included in the video content 102 are included in a texted version of video content. The texted version of video content is herein referred to as texted video content 101 (e.g., the production version). The texted video content 101 includes a portion of shots 105 that include text superimposed over the video content images. These shots 105 including superimposed text are herein referred to as texted elements. In examples, the text includes opening and end titles, subtitles, location titles, forced narratives, lower thirds, and/or other writing superimposed over the video content. Further, as described above, the video content 102 may additionally include textless video content 109 (e.g., at the end of the file). In examples, the textless video content 109 includes textless versions of the texted elements. That is, the video content 102 includes a plurality of scenes 103, where some scenes 103 may include texted elements and other scenes 103 include textless elements.

According to an example implementation and as depicted in FIG. 1, the video processing system 111 includes a textless matching system 122 and includes, or is in communication with, a shot segmentation system 108, a frame selection system 110, and an optical character recognition (OCR) system 112. In an example, various components of the video processing system 111 communicate via various application programming interfaces (APIs). In some examples, the video processing system 111 further includes a video editor 114. In other examples, the video editor 114 is part of a separate system. Each of the textless matching system 122, shot segmentation system 108, frame selection system 110, OCR system 112, and video editor 114 are illustrative of a software application, system, or module that operates on a server computer device 118 or across a plurality of server computer devices 118.

According to an aspect, after receiving the video content 102, the shot segmentation system 108 segments the video content 102 into a plurality of shots 105. For example, the shot segmentation system 108 is configured to analyze the frames 107 of the video content 102 and determine sets of frames 107 that include images taken contiguously by a single camera and represented in a continuous action in time and space. The shot segmentation system 108 may use any standard technique known in the art. An example technique includes evaluating consecutive frames 107 of the video content 102 and determining a similarity score representing a similarity or dissimilarity between the two frames 107. The similarity scores between the frames 107 are evaluated, and a hard and or soft cut is detected between two frames 107 when the score meets or exceeds an absolute or relative threshold value representative of detected shot transition (e.g., abrupt or gradual transitions). Accordingly, the shot segmentation system 108 determines which sequences of one or more frames 107 are grouped as a shot 105.

Figure 2:
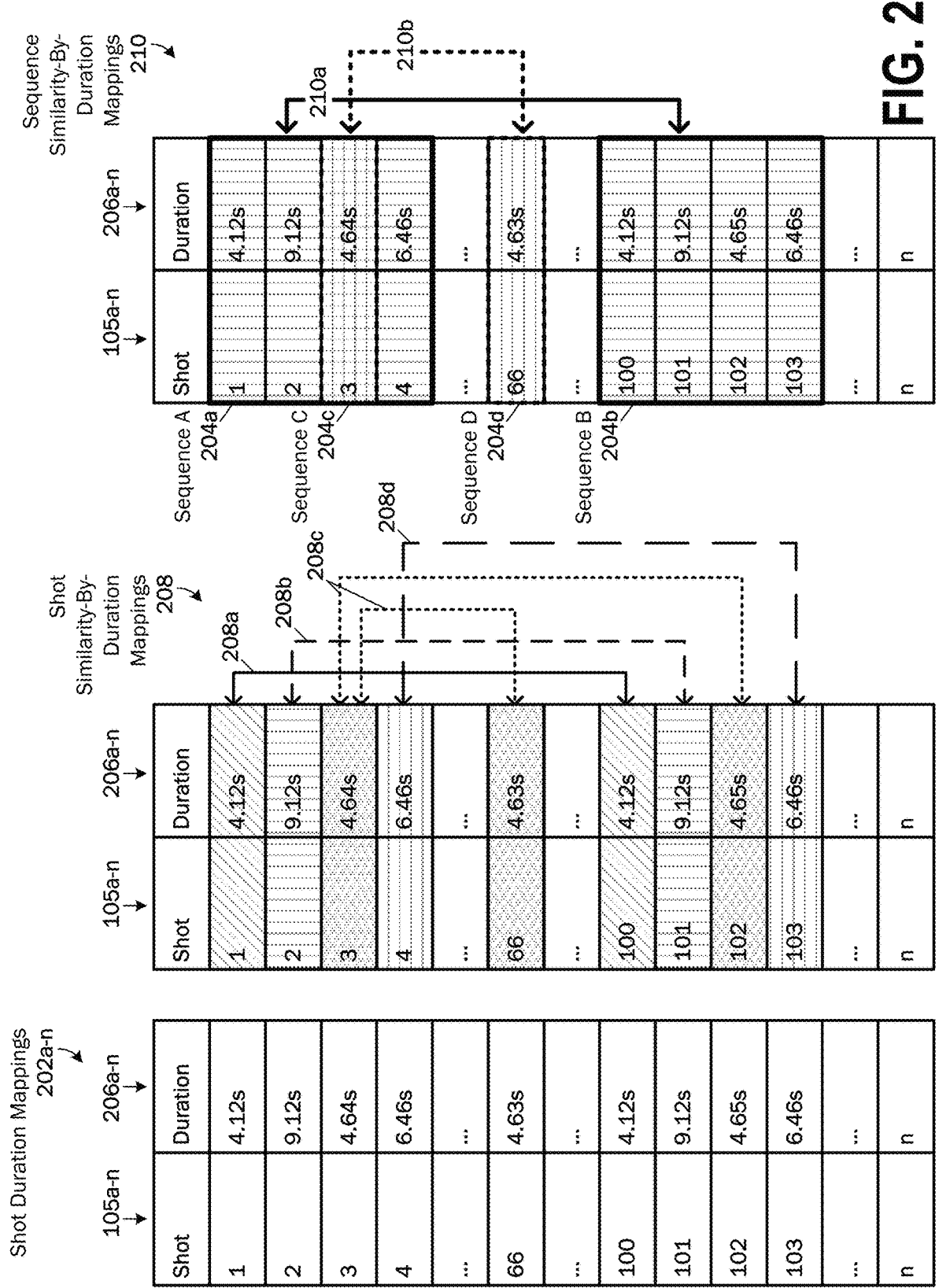
FIG. 2 depicts example mappings determined between shots included in a video content.

Additionally, the shot segmentation system 108 further generates a first set of mappings between shots 105 and shot durations 206. The mappings included in the first set are herein referred to as shot duration mappings 202a-n (collectively, 202). Example shot duration mappings 202 are depicted in FIG. 2, where the shot duration mappings 202 are presented as an index and each determined shot 105 is identified by an index value (e.g., 1-n) and associated with a time unit (e.g., seconds (s)) corresponding to a duration 206 of the shot 105.

In the illustrated example, the shot duration mappings 202 indicate that a $1^{st}$ shot is 4.12 seconds (s) in duration, a $2^{nd}$ shot is 9.12 s, a $3^{rd}$ shot is 4.64 s, a $66^{th}$ shot is 6.63 s, a $100^{th}$ shot is 4.12 s, a $101^{st}$ shot is 9.12 s, a $102^{nd}$ shot is 4.65 s, and a $103^{rd}$ shot is 6.46 s.

According to an example, the textless matching system 122 operates to access the shot duration mappings 202 and generate a second set of mappings between shots 105 with similar durations 206. The mappings included in the second set are herein referred to as shot similarity by duration mappings 208. In some implementations, a determination of duration similarity is based on absolute threshold time differences. In other implementations, the determination of duration similarity is based on relative threshold time differences. Example shot similarity-by-duration mappings 208 are shown in FIG. 2, where a first shot similarity-by-duration mapping 208a is determined between the $1^{st}$ shot and the $100^{th}$ shot; a second shot similarity-by-duration mapping 208b is determined between the $2^{nd}$ shot and the $101^{st}$ shot; a third set of shot similarity-by-duration mappings 208c is determined between the $3^{rd}$ shot and the $66^{th}$ shot and between the $3^{rd}$ shot and the $102^{nd}$ shot; and a fourth shots similarity-by-duration mapping 208d is determined between the $4^{th}$ shot and the $103^{rd}$ shot. For instance, the third set of shot similarity-by-duration mappings 208c may be determined based on a relative threshold time difference, which, in the illustrated example, is less than 0.02 s. As shown, the difference in durations between the $3^{rd}$ shot and the $66^{th}$ shot is 0.01 s, which is within the threshold time difference of less than 0.02 s. Additionally, the difference in durations between the $3^{rd}$ shot and the $102^{nd}$ shot is 0.1 s, which is also within the threshold time difference of less than 0.02 s. Thus, the $3^{rd}$ shot is determined to be similar to the $66^{th}$ and $102^{nd}$ shots. However, the 0.2 s difference in durations between the $66^{th}$ shot and the $102^{nd}$ shot is above the threshold time difference, which causes the textless matching system 122 to determine that the $66^{th}$ shot is dissimilar from the $102^{nd}$ shot.

In some examples, the textless matching system 122 further evaluates the shot similarity-by-duration mappings 208 to identify pairs of sequences 204a-d (collectively, 204) that include a matching number of shots 105 and matching shot durations 206 and generate a third set of mappings between each pair of sequences 204. The mappings generated between pairs of sequences 204 having matching numbers of shots 105 and shot durations 206 are herein referred to as shot sequence similarity-by-duration mappings 210. According to one example, a sequence 204 of shots 105 is a scene 103. In some implementations, determinations of shot number and duration matching are based on an absolute threshold number and/or time differences. In other implementations, determinations of shot number and duration matching are based on a relative threshold number and/or time differences. As an example, a first sequence (e.g., sequence A 204a) is identified to include shots 1-4, a second sequence (e.g., sequence B 204b) is identified to include shots 100-103, a third sequence (e.g., sequence C 204c) is identified to include shot 3, and a fourth sequence (e.g., sequence D 204d) is identified to include shot 4.

Example shot sequence similarity-by-duration mappings 210 between pairs of sequences 204 are shown in FIG. 2. For instance, each pair of sequences 204 are comprised of an earlier occurring sequence (referred to herein as an early sequence) and a later occurring sequence (referred to herein as a late sequence). As an example, a first shot sequence similarity-by-duration mapping 210a is identified between sequence A 204a and sequence B 204b (and represented by vertical cross-hatching). Additionally, other mapping information is determined for each mapping 210, such as a number of shots 205 in each of the sequences 204 in the pair (e.g., 4 shots), the index value of the first shot of the early sequence (e.g., 1), the index value of first shot of the late sequence (e.g., 100), a total duration of each sequence in the pair (e.g., 24.34 s), and a confidence score. A second example shot sequence similarity-by-duration mapping 210b is identified between sequence C 204c and sequence D 204d (and represented by horizontal cross-hatching), where each sequence 204 has one shot having a duration of 4.64 s, the $3^{rd}$ shot is the first shot of the early sequence, and the $66^{th}$ shot is the first shot of the late sequence.

In some examples, the textless matching system 122 further operates to filter the identified shot sequence similarity-by-duration mappings 210 to remove mappings that do not meet one or more thresholds from further analysis. In one example implementation, the shot sequence similarity-by-duration mappings 210 are filtered based on a minimal number (threshold) of consecutive shots 105 in a sequence 204. In another example implementation, the shot sequence similarity-by-duration mappings 210 are filtered based on a minimal sequence duration threshold. For example, shorter sequences 204 that are determined to not meet the threshold are omitted from further evaluation, where sequences 204 that meet or exceed the threshold are passed through the filter for further evaluation. In another example implementation, the shot sequence similarity-by-duration mappings 210 are filtered based on another attribute.

Figure 3:
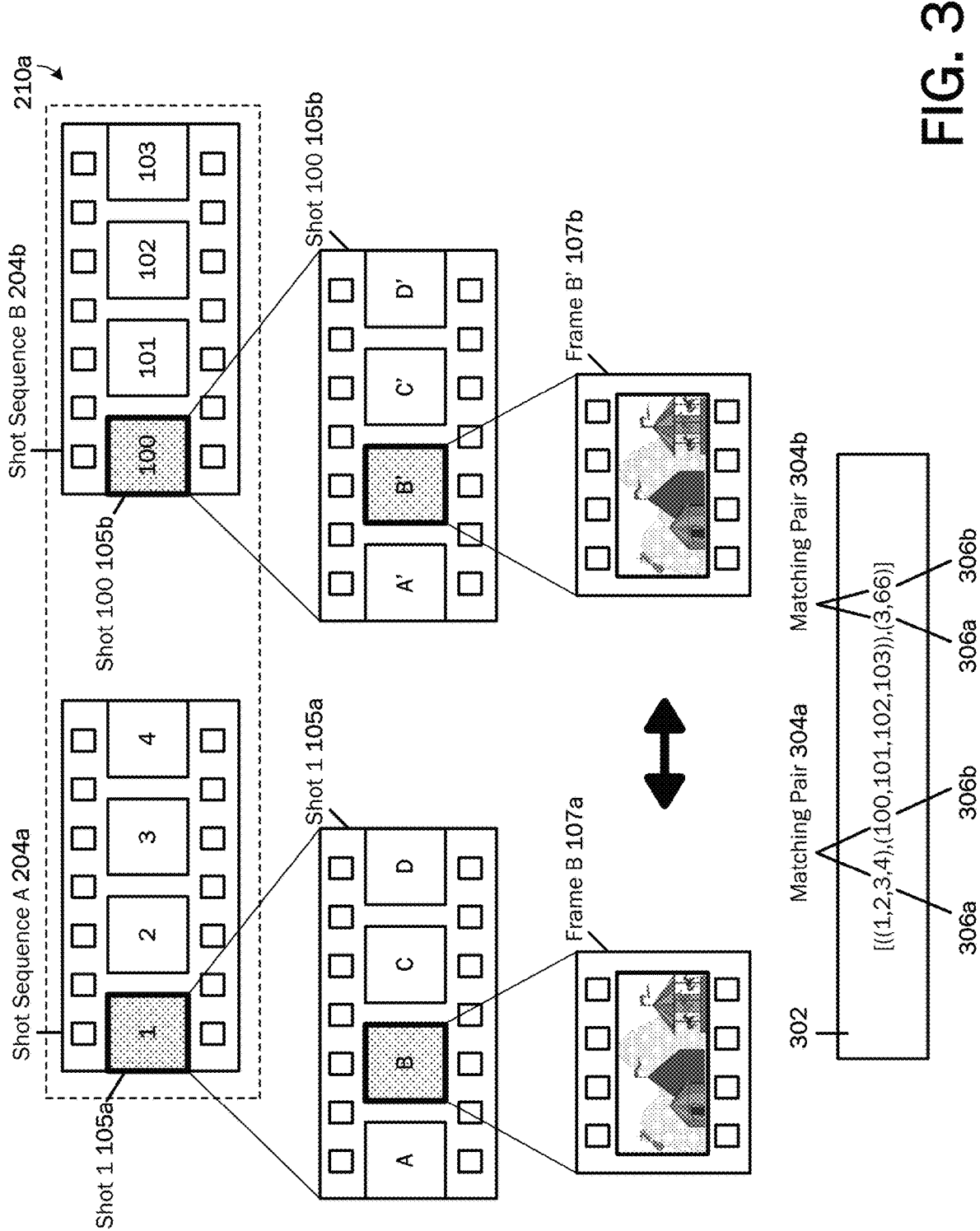
FIG. 3 depicts an example comparison between frames in matching sequences of shots having a similar duration.

In some examples, and with reference to FIG. 3, the frame selection system 110 operates to select a representative corresponding frame (e.g., 107a and 107b) from each identified sequence (e.g., 204a and 204b) in each shot sequence similarity-by-duration mapping (e.g., 210a) for comparison. In one example implementation, the representative frames 107 is selected periodically (e.g., according to a selected or random time in the sequence). In another example implementation, the representative frames 107 are selected based on one or more descriptive attributes of the frames, such as frames having high contrast and/or stability, among other attributes.

The frame selection system 110 further operates to compare the selected representative frames 107 using an image comparison metric, such as Mean Squared Error (MSE). Other example image comparison metrics that can be used in addition to or as an alternative to MSE include normalized correlation, pattern intensity, and mutual information. For example, the frame selection system 110 may be configured to use any standard technique known in the art to analyze the selected representative frames 107 to determine whether the image content in the frames 107 (and, thus, the associated shots 105) match. In some examples, prior to the comparison, the OCR system 112 operates to detect and mark areas to ignore where text is present in a frame 107. When representative frames 107 in a mapping 210 are determined to match, the frames are included in a first output, which may include a list 302 of matching pairs 304a,b (generally, 304) of detected matched scenes 103 (e.g., sequences 204 of shots 105). In some examples, matched scenes 103 included in the list 302 differ only in the presence or absence of overlaid text. For instance, shots 100-103 of shot sequence B 204b are determined to be textless versions of texted versions of shots 1-4 of shot sequence A 204a. Additionally, shot 66 of shot sequence D 204d is determined to be a textless version of a texted version of shot 3 of shot sequence C 204c. In examples, the first output is provided to the video editor 114, which operates to replace the early sequence 306a of the matching pair 304 with the late sequence 306b of the pair, thereby replacing the texted scene 103 with the textless scene 103. In some examples, if text was detected in the early sequence 306a (that was not removed), the first output may include a signal to the video editor 114 to insert translated text in this part of the video content 102. In examples, a second output is provided by the video editor 114, which may include an edited video content 102 including texted scenes 103 replaced with textless scenes 103.

Figure 4:
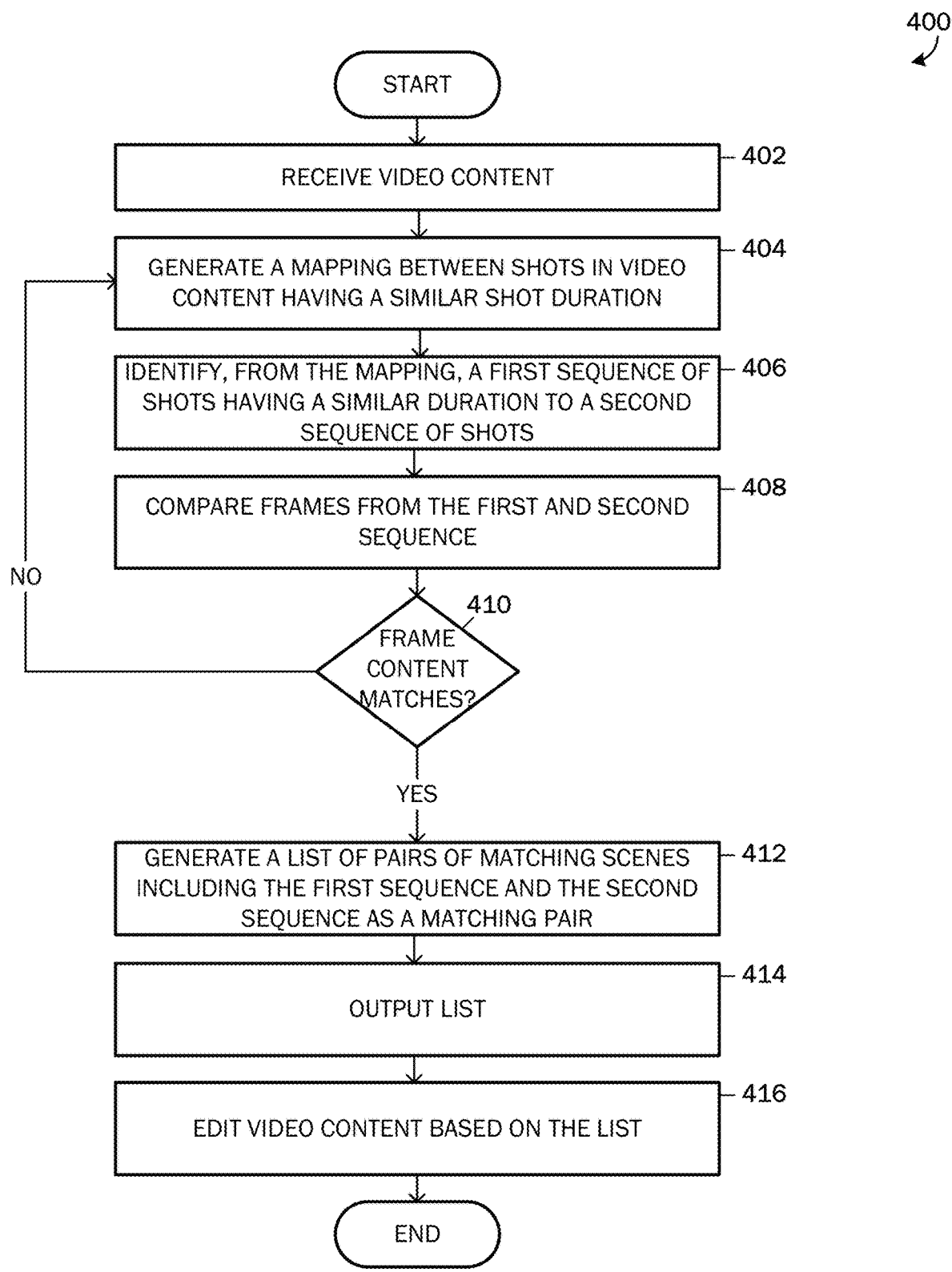
FIG. 4 depicts an example method for matching textless elements to texted elements in a video content.

FIG. 4 depicts an example method 400 for matching textless elements to texted elements in video content 102. The operations of method 400 may be performed by one or more computing devices, such as one or more computing devices included in the video processing system 111. For example, the method 400 is performed by the one or more of the textless matching system 122, the shot segmentation system 108, the frame selection system 110, the OCR system 112, and the video editor 114 depicted in FIG. 1.

At operation 402, video content 102 is received. For example, the video processing system 111 receives the video content 102 from a video content provider 116. The video content 102 includes a texted version of video content 101 and textless video content 109 including one or more scenes 103 from which text included in a corresponding scene of the texted version of video content 101 has be removed.

At operation 404, a first set of mappings (e.g., shots duration mappings 202) are generated between the shots 105 included in the video content 102 and the durations of the shots 105 (e.g., shot durations 206). For example, the video content 102 is segmented into a plurality of shots 105, each including a sequence of consecutive frames 107 without interruption. In segmenting the video content 102, the shot segmentation system 108 analyzes the frames 107, detects shot transitions (e.g., abrupt or gradual transitions), and determines which sequences of one or more frames 107 are grouped as a shot 105. Further, an index including shot duration mappings 202 between an index value associated with each determined shot 105 and the shot's duration 206 is generated.

At operation 406, sequences 204 of shots 105 included in the index having similar durations are identified. For example, shot similarity-by-duration mappings 208 between a shot 105 and an array of one or more shots 105 with similar durations 206 are generated. In some examples, the shot similarity-by-duration mappings 208 are evaluated to identify shot sequence similarity-by-duration mappings 210 between pairs of sequences 204 that include a matching number of shots 105 and matching shot durations 206. In an example, additional mapping information is determined for each mapping 210 (e.g., a number of shots 205 in the sequences 204, the index value of the first shot of the early sequence of the pair, the index value of first shot of the late sequence of the pair, a total duration of each sequence in the pair, a confidence score). In some examples, the identified shot sequence similarity-by-duration mappings 210 is filtered. In one example, shorter sequences 204 that are determined to not meet a sequence length (or other) threshold are omitted from further evaluation.

At operation 408, corresponding frames 107 in a pair of sequences 204 are selected and compared. For example, a representative frame 107 from each identified sequence 204 in each shot sequence similarity-by-duration mapping (e.g., shot sequence similarity-by-duration mapping 210) is selected periodically or based on one or more descriptive attributes of the frames 107. The selected representative frames 107 are compared using an image comparison metric, such as Mean Squared Error (MSE) for determining whether the image content in the frames 107 (and, thus, the associated shots 105) match. In some examples, prior to the comparison, text that is present in a frame 107 is detected and marked to ignore in the comparison.

At decision operation 410, a determination may be made as to whether image content included in the representative frames 107 match. For example, when a determination is made that the representative frames 107 in a shot sequence similarity-by-duration mapping match, at operation 412, a list 302 of matching pairs 304 of detected matched scenes 103 (e.g., sequences 204 of shots 105) is generated. Each matched scene 103 includes an early sequence 306a of shots 105 including one or more texted frames 107 and a late sequence 306b of shots 105 including one or more textless frames 107.

At optional operation 414, the list 302 is output to a video editor 114, where the textless scenes 103 replaces the determined corresponding texted scenes 103. In some examples, the video editor 114 is included in the video processing system 111, and the output of the system includes an edited video content 102. At optional operation 416, texted scenes 103 may be replaced with the textless scene 103. In some examples, further processing of the edited video content 102 is performed, such as adding text in a language of a foreign region to the replaced texted scenes 103 to produce the video content 102 in the foreign language.

Figure 5:
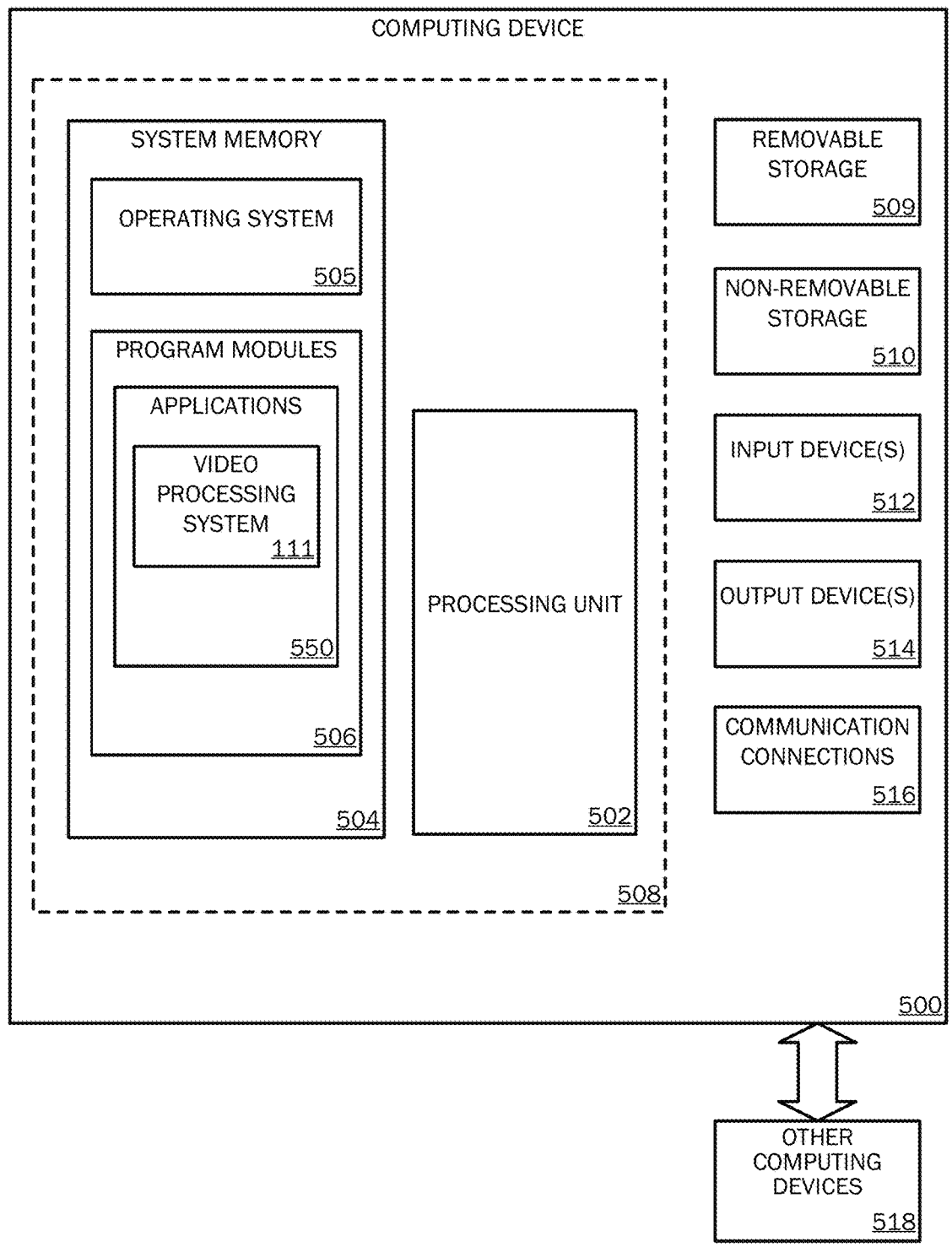
FIG. 5 is a block diagram illustrating example physical components of a computing device with which aspects of the invention may be practiced.
Figure 6A:
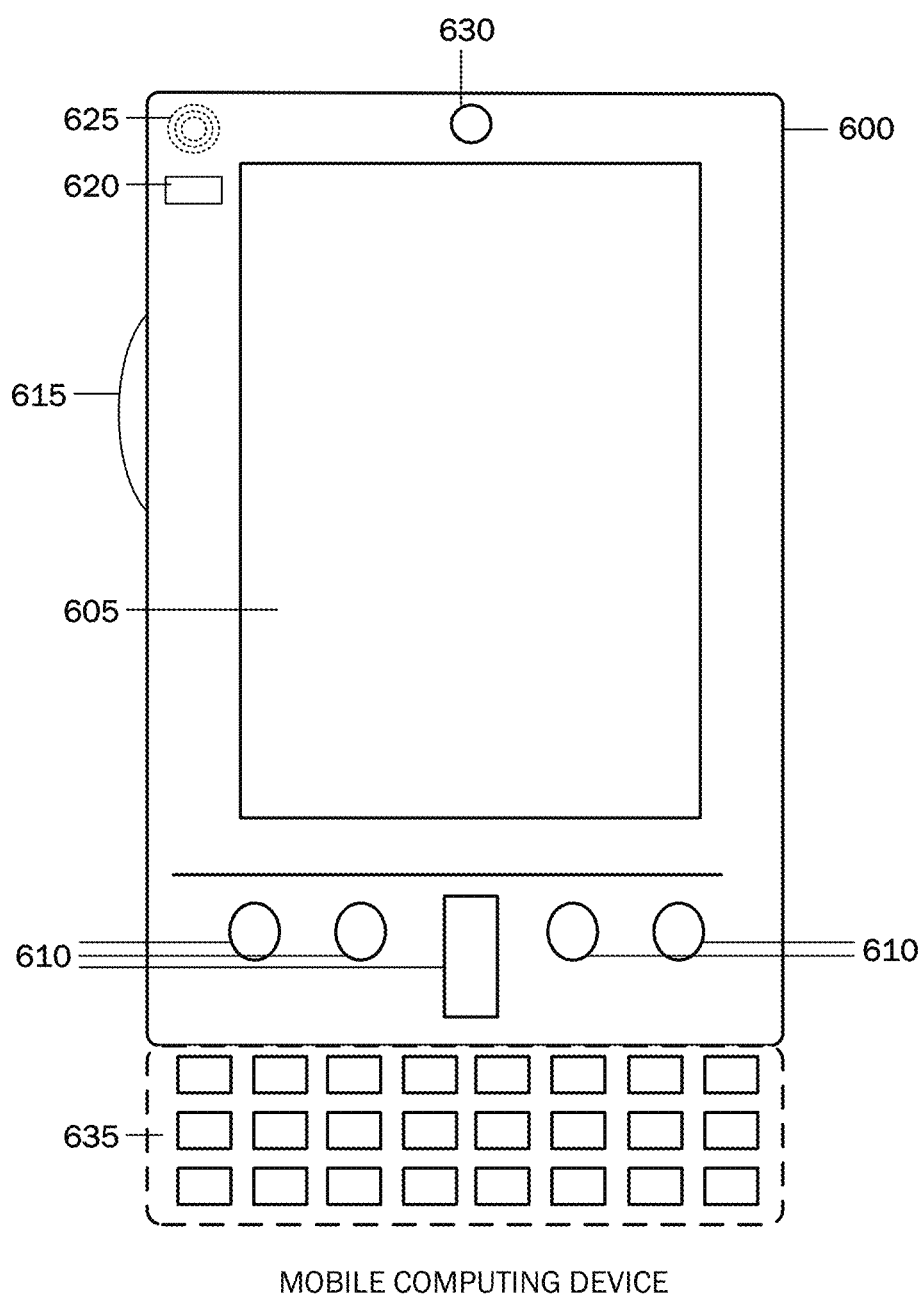
FIGS. 6A and 6B are simplified block diagrams of a mobile computing device with which aspects of the present invention may be practiced.
Figure 6B:
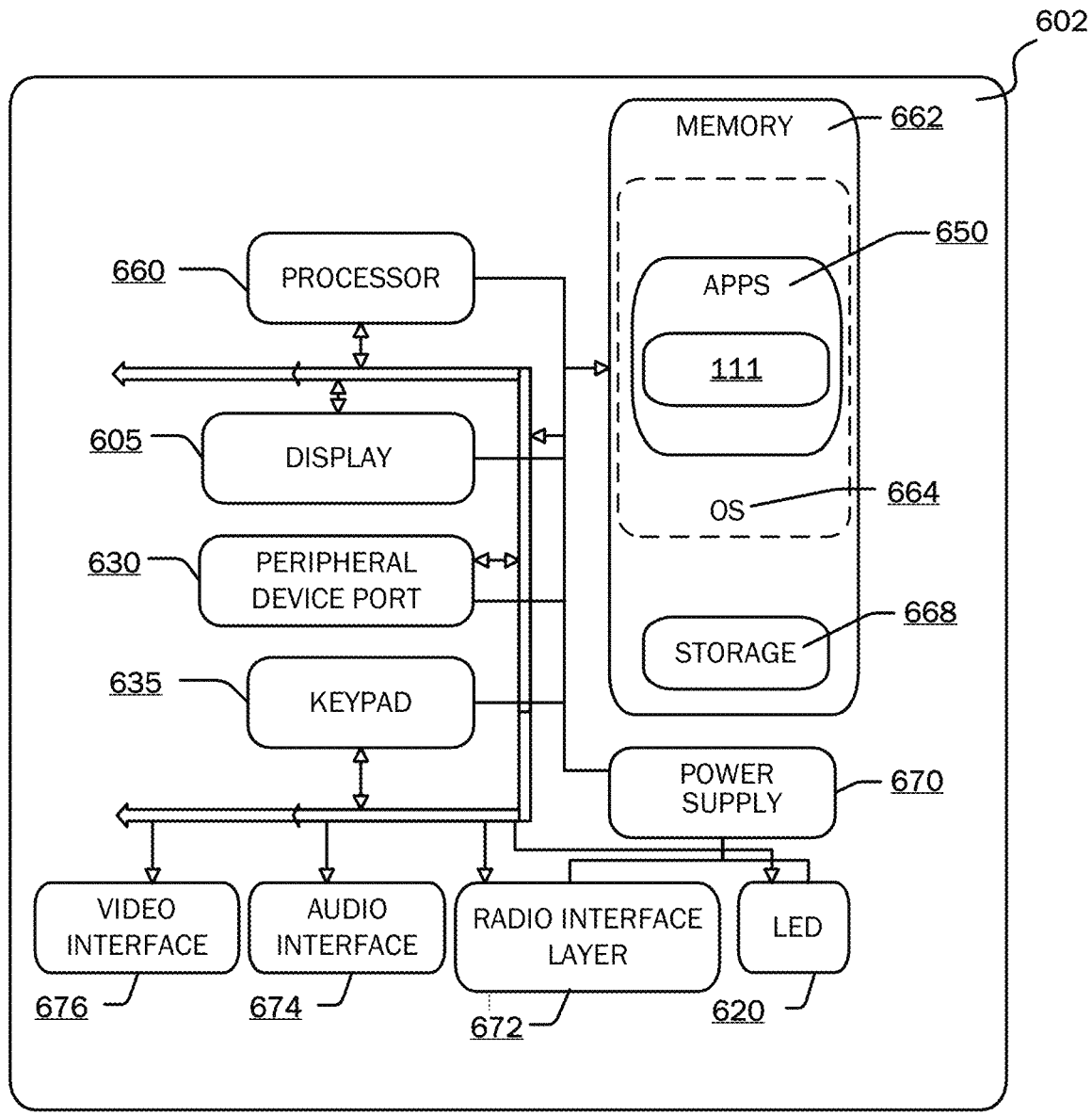

FIGS. 5, 6A, and 6B and the associated descriptions provide a discussion of a variety of operating environments in which examples of the invention may be practiced. However, the devices and systems illustrated and discussed with respect to FIGS. 5, 6A, and 6B are for purposes of example and illustration and are not limiting of a vast number of computing device configurations that may be utilized for practicing aspects of the invention, described herein.

FIG. 5 is a block diagram illustrating physical components (i.e., hardware) of a computing device 500 with which examples of the present disclosure may be practiced. The computing device components described below may be suitable for the video processing system 111 described above. In a basic configuration, the computing device 500 includes at least one processing unit 502 and a system memory 504. Depending on the configuration and type of computing device 500, the system memory 504 may comprise volatile storage (e.g., random access memory), non-volatile storage (e.g., read-only memory), flash memory, or any combination of such memories. The system memory 504 may include an operating system 505 and one or more program modules 506 suitable for running software applications 550, such as one or more components of the video processing system 111.

The operating system 505 may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including one or more of the stages of the method 400 illustrated in FIG. 4. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to matching textless elements to texted elements in video content 102, may be operated via application-specific logic integrated with other components of the computing device 500 on the single integrated circuit (chip). Examples of the present disclosure may also be practiced using other technologies capable of performing logical operations such as, for example, AND, OR, and NOT, including mechanical, optical, fluidic, and quantum technologies.

The computing device 500 may also have one or more input device(s) 512 such as a keyboard, a mouse, a pen, a sound input device, a touch input device, a camera, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

FIGS. 6A and 6B illustrate a mobile computing device 600, for example, a mobile telephone, a smart phone, a tablet personal computer, a laptop computer, and the like, with which aspects of the invention may be practiced. With reference to FIG. 6A, an example of a mobile computing device 600 for implementing at least some aspects of the present technology is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In alternative examples, the mobile computing device 600 is a portable phone system, such as a cellular phone. The mobile computing device 600 may also include an optional keypad 635. Optional keypad 635 may be a physical keypad or a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In one example, the system 602 is implemented as a "smart phone" capable of running one or more applications (e.g., videoconference or virtual meeting application, browser, e-mail, calendaring, contact managers, messaging clients, games, and media clients/players). In some examples, the system 602 is integrated as a computing device, such as an integrated personal digital assistant (PDA) and wireless phone.

One or more application programs 650 (e.g., one or more of the components of the video processing system 111) may be loaded into the memory 662 and run on or in association with the operating system 664, such as the textless matching system 122, the shot segmentation system 108, the frame selection system 110, the OCR system 112 and/or the video editor 114. Other examples of the application programs 650 include videoconference or virtual meeting programs, phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at a remote device or server. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving RF communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

The visual indicator 620 (e.g., light emitting diode (LED)) may be used to provide visual notifications and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. The system 602 may further include a video interface 676 that enables an operation of a peripheral device port 630 (e.g., an on-board camera) to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

As will be understood from the foregoing disclosure, many technical advantages and improvements over conventional textless content matching technologies result from the present technology. For instance, the present technology provides an automated process for matching textless elements to texted elements in video content 102 based on shot-based and sequence-based mappings between different shots in the video content. Automation of this previously manual process provides an efficient and reliable method for interacting with textless content and increases the speed at which media content can be translated to different languages and distributed.

As will also be understood from the foregoing disclosure, in an aspect, the present technology relates to a system for automatically matching textless elements to texted elements in video content 102. The system includes a processor; and memory storing instructions that, when executed by the processor, cause the system to receive video content comprising a plurality of shots; generate a mapping between shots having similar shot durations in a plurality of shots within video content; identify, from the mapping, a first sequence of shots having a similar sequence duration to a second sequence of shots; determine the first sequence and the second sequence include matching content; and generate an indication that the first sequence and the second sequence are a pair of matching scenes.

In another aspect, the present technology relates to a computer-implemented method for automatically matching textless elements to texted elements in video content 102, comprising: generating a mapping between shots having similar shot durations in a plurality of shots within video content; identifying, from the mapping, a first sequence of shots having a similar sequence duration to a second sequence of shots; determining the first sequence and the second sequence include matching content; and generating a list of pairs of matching scenes including the first sequence and the second sequence as a pair.

In another aspect, the present technology relates to a computer-readable medium storing instructions that, when executed by a computer, cause the computer to: generate a mapping between shots having similar shot durations in a plurality of shots within video content; identify, from the mapping, a first sequence of shots having a similar sequence duration to a second sequence of shots; select a representative frame included in the first sequence and a corresponding representative frame included in the second sequence; compare image content in the representative frames of the first sequence and the second sequence; determine the first sequence and the second sequence include matching content; and generate a list of pairs of matching scenes including the first sequence and the second sequence as a pair, wherein the first sequence includes a texted version of video content and the second sequence includes a textless version of the texted version of video content.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. A system for matching textless elements to texted elements in video content, the system comprising:
   a processor; and
   memory storing instructions that, when executed by the processor, cause the system to:
   generate a mapping between shots having similar shot durations in a plurality of shots within video content;
   identify, from the mapping, a first sequence of shots having a similar sequence duration to a second sequence of shots;
   determine the first sequence and the second sequence include matching content; and
   generate an indication that the first sequence and the second sequence are a match.

2. The system of claim 1, wherein the instructions further cause the system to replace the first sequence with the second sequence in the video content based on the indication.

3. The system of claim 1, wherein the instructions further cause the system to provide the indication that the first sequence and the second sequence are a match to a video editor.

4. The system of claim 1, wherein the second sequence includes a textless version of a scene and the first sequence includes a texted version of the scene.

5. The system of claim 1, wherein the mapping between shots having the similar shot durations is generated based on:

an absolute threshold of time difference between the shots; or a relative threshold of time difference between the shots.

6. The system of claim 1, wherein the first sequence of shots is identified as having the similar sequence duration to the second sequence of shots based on:

an absolute threshold of time difference between the shots; or a relative threshold of time difference between the shots.

7. The system of claim 1, wherein the determination that the first sequence and the second sequence include matching content comprises:

selecting a representative frame included in the first sequence and a corresponding representative frame included in the second sequence; and comparing image content in the representative frame and the corresponding representative frame using an image comparison metric.

8. The system of claim 7, wherein prior to the determination that the first sequence and the second sequence include matching content, the instructions further cause the system to allow the first sequence and the second sequence to pass through a filter based on:

a number of shots included in the first sequence and a number of shots included in the second sequence meeting or exceeding a first threshold; or a sequence duration of the first sequence and a sequence duration of the second sequence meeting or exceeding a second threshold.

9. A computer-implemented method for matching textless elements to texted elements in video content, comprising:

generating a mapping between shots having similar shot durations in a plurality of shots within video content;

identifying, from the mapping, a first sequence of shots having a similar sequence duration to a second sequence of shots;

determining the first sequence and the second sequence include matching content; and generating an indication that the first sequence and the second sequence are a match.

10. The method of claim 9, further comprising replacing the first sequence with the second sequence in the video content.

11. The method of claim 9, further comprising providing the indication that the first sequence and the second sequence are a match to a video editor.

12. The method of claim 9, wherein the first sequence comprises a texted version of video content and the second sequence comprises a textless version of the texted version of video content.

13. The method of claim 9, wherein generating the mapping between shots having similar shot durations comprises:

determining the shots have similar shot durations based on an absolute threshold of time difference between the shots; or determining the shots have similar shot durations based on a relative threshold of time difference between the shots.

14. The method of claim 9, wherein identifying that the first sequence has the similar sequence duration to the second sequence comprises:

determining the first sequence and the second sequence have the similar sequence duration based on an absolute threshold of time difference between the shots; or determining the first sequence and the second sequence have the similar sequence duration based on a relative threshold of time difference between the shots.

15. The method of claim 9, wherein determining the first sequence and the second sequence include matching content comprises:

selecting a representative frame included in the first sequence and a corresponding representative frame included in the second sequence; and comparing between image content in the representative frames using an image comparison metric.

16. The method of claim 15, wherein prior to the determination of matching content, allowing the first sequence and the second sequence to pass through a filter based on:

a number of shots included in the first sequence and a number of shots included in the second sequence meeting or exceeding a first threshold; or a sequence duration of the first sequence and a sequence duration of the second sequence meeting or exceeding a second threshold.

17. The method of claim 15, wherein prior to the determination that the first sequence and second sequence include matching content:

identifying text included in the first sequence; and removing the text.

18. A computer storage medium storing instructions that, when executed by a computer, cause the computer to:

receive a video file comprising a plurality of shots of video content;

generate a mapping between shots having similar shot durations in the plurality of shots;

identify, from the mapping, a first sequence of shots having a similar sequence duration to a second sequence of shots;

select a representative frame included in the first sequence and a corresponding representative frame included in the second sequence;

compare image content in the representative frames of the first sequence and the second sequence;

determine the first sequence and the second sequence include matching content; and generate an indication that the first sequence and the second sequence are a match, wherein the first sequence includes a texted version of video content and the second sequence includes a textless version of the texted version of video content.

19. The computer storage medium of claim 18, wherein the instructions further cause the computer to, based on the indication that the first sequence and the second sequence are a match, replace the first sequence with the second sequence in the video content.

20. The computer storage medium of claim 18, wherein the instructions further cause the computer to provide the indication that the first sequence and the second sequence are a match to a video editor.

* * * * *